3,304,305
SUBSTITUTED THIAZOLES AND PROCESSES FOR THEIR PREPARATION
Joseph Kiss and Hans Spiegelberg, Basel, Switzerland, assignors to Hoffmann-La Roche Inc., Nutley, N.J., a corporation of New Jersey
No Drawing. Filed Dec. 14, 1964, Ser. No. 418,307
Claims priority, application Switzerland, Dec. 20, 1963, 15,753/63
32 Claims. (Cl. 260—256.5)

The present invention relates to substituted thiazoles and to processes for their preparation. More particularly, the invention relates to thiazoles of the formula:

$$\underset{R_2\ \ R_3}{R_1} \diagup\!\!\!\diagdown \text{thiazole} \diagdown\!\!\!\diagup CH_2-CH_2-OR_4 \quad (I)$$

wherein
$R_1$ is hydrogen or lower alkyl,
$R_2$ is hydrogen, alkyl, alkenyl, alkynyl, aryl, or aralkyl,
$R_3$ is hydroxyl, or $R_2$ and $R_3$ can both be alkoxy, and
$R_4$ is hydrogen or acyl, and of quaternization products of these thiazoles.

The process in accordance with the invention is characterized in that a compound of the formula:

$$R_1-CH-C\underset{OR_5\ \ S}{\diagup\!\!\!\!\diagdown}NH_2 \quad (II)$$

wherein
$R_1$ has the same meaning as above, and
$R_5$ is tetrahydro-pyranyl, tetrahydro-furanyl, vinyl, allyl, or benzyl, is reacted with a compound of the formula:

$$\underset{R_6-CH-CH_2-CH_2-OR_4}{OC-CH_3} \quad (III)$$

wherein
$R_4$ has the same meaning as above, and
$R_6$ is halogen, and the $R_5$ group is cleaved. The product obtained is a compound of Formula I wherein $R_2$ is hydrogen, and $R_3$ is hydroxyl, i.e., a compound of the formula:

$$R_1-CH-\underset{OH\ \ S}{\diagup\!\!\!\!\diagdown}\!\!\diagdown C-CH_2-CH_2-OR_4 \quad (IV)$$

wherein $R_1$ and $R_4$ have the meanings given above.

When it is desired to prepare a compound of Formula I wherein $R_2$ is other than hydrogen, the compound of Formula IV is oxidized to the corresponding ketone, i.e., a compound of the formula:

$$R_1-C-\underset{O\ \ S}{\diagup\!\!\!\!\diagdown}\!\!\diagdown C-CH_2-CH_2-OR_4 \quad (V)$$

wherein $R_1$ and $R_4$ have the meanings given above.
The compound of Formula V is then either (a) reacted with a compound of the formula:

$$R_2'-Mg-R_7$$

wherein
$R_2'$ is alkyl, alkenyl, alkynyl, aryl, or aralkyl, and
$R_7$ is halogen, and the resulting Grignard addition product is decomposed to form a compound of Formula I wherein $R_2$ is $R_2'$ and $R_3$ is hydroxyl, i.e., a compound of the formula:

$$R_1\diagup\!\!\!\diagdown\underset{R_2'\ \ OH}{\diagdown}\!\!\diagup C-CH_2-CH_2-OR_4 \quad (VI)$$

wherein $R_1$, $R_2'$, and $R_4$ have the meanings given above, or (b) treated with an acetalizing agent to form a compound of Formula I wherein $R_2$ and $R_3$ are both alkoxy, i.e., a compound of the formula:

$$R_1\diagup\!\!\!\diagdown\underset{\text{alkyl O}\ \ \text{O alkyl}}{\diagdown}\!\!\diagup C-CH_2-CH_2-OR_4 \quad (VII)$$

wherein $R_1$ and $R_4$ have the meanings given above.
The compound of Formula VII wherein $R_4$ is acyl can be deacylated, if desired, to form a compound of Formula VII wherein $R_4$ is hydrogen.

The compounds of Formulas I, IV, VI, and VII can be quaternized, if desired, by treatment with a compound of the formula:

$$\underset{CH_3}{\overset{NH_2 \cdot HX}{\diagup\!\!\!\diagdown}}\!\!\!-CH_2X \quad (VIII)$$

wherein X is the anion of a strong organic or inorganic acid.

The quaternization product has the formula:

$$\text{(IX)}$$

wherein $R_1$, $R_2$, $R_3$, $R_4$, and X have the meanings given above.

In all the above formulae, $R_1$ is preferably hydrogen or methyl.
$R_2$ is preferably hydrogen, lower alkyl, lower alkenyl, lower alkynyl, phenyl, or benzyl.
When the term "lower alkyl" and the lower alkyl portion of "lower alkoxy" used herein are to be understood to mean straight or branched chain alkyl groups having from 1 to 7 carbon atoms, inclusive, e.g., methyl, ethyl, propyl, isobutyl, hexyl, etc., the term "lower alkenyl" is to be understood to mean a straight or branched chain $C_2$ to $C_7$ alkyl group having a single double bond, e.g., vinyl, allyl, etc. The term "lower alkynyl" is to be understood to mean a straight or branched chain $C_2$ to $C_7$ alkyl group having a single triple bond, e.g., propargyl, etc.
When $R_2$ and $R_3$ are both alkoxy, they are preferably lower alkoxy, most preferably methoxy or ethoxy.
$R_6$ is preferably chlorine or bromine, and $R_7$ is preferably chlorine, bromine, or iodine.
When $R_4$ is an acyl group, the acyl group can be derived from organic and inorganic acids; for example, from lower aliphatic carboxylic acids such as acetic acid, propionic acid, etc., from aromatic carboxylic acids such as benzoic acid, or from mineral acids such as phosphoric acid, sulfuric acid, etc.
X in Formulas VIII and IX is preferably the anion of a strong organic acid such as formic acid, oxalic acid, a benzoic acid, e.g., a nitro- or halogen-substituted (such as, for example, 4-nitro-benzoic acid, 3,4-dinitro-benzoic acid or 2-chloro-benzoic acid), a halogenated aliphatic carboxylic acid such as trifluoro- or trichloro-acetic acid, etc., or an inorganic acid such as hydrochloric acid, hydrobromic acid, sulfuric acid, nitric acid, or phosphoric acid.

The thio-acid amides of Formula II used as starting materials can be prepared, for example, from nitriles of the formula:

$$R_1-CH-C\equiv N \atop OR_5 \qquad (IX)$$

wherein $R_1$ and $R_5$ have the same meanings as above, by treatment with hydrogen sulfide.

The ring formation effected in the first stage of the process of the invention by linkage of compounds of the Formula II with compounds of the Formula III is conveniently effected in an inert solvent; for example, in a hydrocarbon such as benzene, toluene, etc., in a halogenated hydrocarbon such as methylene chloride, chloroform, carbon tetrachloride, etc., in an ether such as diethyl ether, dioxan, tetrahydrofuran, etc., or an alkanoic acid ester such as acetic acid ethyl ester.

The ring formation is furthermore conveniently effected in the presence of an acid-binding agent, for example, a tertiary base such such as pyridine, quinoline, isoquinoline, collidine, 2-methyl-5-ethyl-pyridine, a trialkylated amine (such as triethyl amine), etc. The thiazole derivative formed, however, can itself also function as the acid-binding agent.

The ring formation is facilitated by heating the reaction mixture, e.g., up to the boiling point of the mixture. The reaction components are preferably employed in the molar ratio 1:1 or with a small excess of the ketone of Formula III.

The thiazole derivatives formed can be purified by fractional distillation after separation of the precipitated salt.

By suitable choice of the $R_5$ group in the compound of Formula II, a cyclization product with a free hydroxyl group is obtained directly. This occurs especially when $R_5$ is tetrahydro-pyranyl or tetrahydro-furanyl. If $R_5$ is one of the other possible groups, the cleavage of these groups (wherein $R_4$ in Formula III is acyl) can be effected selectively; for example, by hydrolysis or by hydrogenolysis.

Vinyl or allyl groups can be cleaved off hydrolytically with mild acid conditions (e.g., with the aid of dilute hydrochloric acid).

The benzyl residue can be cleaved off catalytically (e.g., with the aid of Raney nickel).

The compounds obtained in this stage of the reaction, such as, for example, the 2-hydroxymethyl-4-methyl-5-($\beta$-hydroxyethyl or $\beta$-acyloxyethyl)-thiazole represent important compounds. These compounds can then be quaternized, if desired.

The condensation product can also, however, be oxidized (if desired, after cleaving off the $R_5$ group), whereby the hydroxyl group in the 2-position of the thiazole ring is exclusively dehydrogenated to an oxo group under the conditions of the instant process.

This oxidation preferably takes place in glacial acetic with the calculated quantity of chromium trioxide. The oxidation can also be carried out with air in a solvent (such as, for example, in a mixture of water and dioxane) in the presence of a noble metal catalyst such as palladium or platinum or with the aid of a copper catalyst. Likewise, for example, potassium permanganate in acetone
selenium dioxide in water/dioxane
hydrogen peroxide in water
potassium ferricyanide in water can be used as the oxidizing agent.

The catalytically initiated oxidation is advantageously carried out at room temperature, the chemical oxidation preferably at elevated temperature, e.g., up to about 100° C.

The further reaction of the oxo compound of Formula V with a compound of the formula $R_2'-Mg-R_7$ is effected under the usual conditions of the Grignard reaction, preferably in an ether such as diethyl ether, tetrahydrofuran or dioxane; or in an aromatic hydrocarbon such as benzene or toluene. The reaction is promoted by heating (up to the boiling point of the reaction mixture, if desired).

The organo-metallic compound formed is preferably decomposed by the action of ammonium chloride or ammonium acetate.

It is worthy of note that the acyl residue $R_5$ which may be present is saponified only to a small extent by the decomposition of the Grignard complex under mild conditions. This residue can, however, insofar as this is desired, be saponified in the usual manner and be cleaved off with formation of the hydroxyl group.

The resulting thiazole derivatives of Formula VI are conveniently taken up in an organic solvent, and after evaporation of the solvent, are purified by fractional distillation, or dissolved in a non-polar solvent, by adsorption on activated charcoal or fuller's earth.

The oxo compounds of Formula V, as pointed out above, can alternatively be acetalized. As acetalizing agents there can be used those agents which can form a dialkyl acetal, preferably a di-lower alkyl acetal, e.g., orthoformic acid esters, alkanols, acetone-dialkyl-acetal, etc., in the presence of a strong acid such as anhydrous hydrochloric or sulfuric acids in an aromatic hydrocarbon such as benzene or toluene.

The acetalization itself is carried out with advantage in a halogenated hydrocarbon, e.g., in methylene chloride, chloroform, or in carbon tetrachloride, or instead, in lower alkanols such as ethyl or isopropyl alcohol.

The quaternization of the thiazole derivatives of Formulas I, IV, VI, and VII with the pyridine compound of the Formula VIII is preferably effected in the presence of a solvent with a high dipole-moment, e.g., nitromethane, nitrobenzene, chloroform, acetonitrile, acetone, dimethyl-formamide, ethyl or isopropyl alcohol, etc., advantageously at a temperature between 60 and 130° C. The reaction components are employed in the molar proportion 1:1 or with a small excess of the thiazole base.

The quaternization products of Formula IX obtained can be purified by fractional crystallization.

The compounds of Formulas I, IV, VI, VII, and their quaternization products of Formula IX are valuable vitamin $B_1$ derivatives, the phosphate or pyrophosphates of which are the natural coenzyme constituents in carbohydrate or protein metabolism. The compounds of the above formulas exhibit high vitamin $B_1$ activity which persists for a considerable time, probably due to the gradual release of free vitamin $B_1$. They can be employed pharmaceutically in the same manner as vitamin $B_1$ itself. They can be employed, for example, in the form of pharmaceutical preparations which contain them or their salts in admixture with a pharmaceutical, organic, or inorganic inert carrier material suitable for enteral, percutaneous, or parenteral application (such as, for example, water, gelatin, gum arabic, lactose, starch, magnesium stearate, talc, vegetable oils, polyalkylene glycols, Vaseline, etc.). The pharmaceutical preparations can be present in solid form (e.g., as tablets, dragées, suppositories, capsules), in semi-solid form (e.g., salves) or in liquid form (e.g., as solutions, suspensions or emulsions). They may be sterilized and/or contain additive materials such as preserving, stabilizing, wetting, or emulsifying agents, salts for regulating osmotic pressure or buffers. They can also contain yet other valuable therapeutic materials.

*Example 1*

260 g. of potassium cyanide and 500 ml. of distilled water are poured into a three-liter flask which is fitted with a stirrer, thermometer, and dropping funnel and are brought into solution with heating. After cooling, the mixture is treated with 314 ml. of 40 percent aqueous formaldehyde and diluted with 285 ml. of water. The temperature is not allowed to exceed +10° C. After this addition it is further stirred for a half hour at 5 to 10° C. Subsequently, the pH value of the solution is adjusted to 3.0 with 25 percent sulfuric acid with stirring and cooling with ice. The potassium sulfate precipitating out is filtered by suction and the aqueous solution extracted with ether (containing 2 percent alcohol). The ether solution is evaporated at 30° C.

The 284.4 g. of glycolic acid nitrile obtained are dissolved in 1000 ml. of absolute benzene, treated with 3.0 g. of p-toluenesulfonic acid and poured into a three-liter four-necked flask which is fitted with stirrer, reflux condenser and dropping funnel. 506 ml. of freshly distilled dihyropyran are added dropwise with stirring and cooling with ice. Subsequently the reaction mixture is stirred for yet a further hour and boiled for 2 hours under reflux conditions. The reaction mixture is poured onto 500 g. of ice and neutralized by addition of 10 g. of sodium bicarbonate. The benzene layer is separated from the aqueous phase, dried over sodium sulfate and purified by adsorption on an aluminum oxide column. The benzene eluates are evaporated in vacuum. The residue, completely freed of the glycolic acid nitrile, is distilled in vacuum. Glycolic acid nitrile tetrahydropyranyl ether is obtained in the form of a liquid as clear as water, $n_D^{20}=1.4500$.

100 g. of glycolic acid nitrile tetrahydro-pyranyl ether are dissolved in 500 ml. of absolute alcohol which contains 1 percent diethyl amine and saturated with hydrogen sulfide gas at −20° C. The reaction mixture is left to stand in a closed vessel at room temperature for 4 to 5 days. Subsequently the flask is again cooled to −20° C., opened and freed from hydrogen sulfide under reduced pressure. The residue is taken up in the 2- to 5-fold quantity of acetic acid ethyl ester, heated, and treated with low-boiling petroleum ether. From this solvent mixture there crystallizes tetrahydro-pyranyloxy-thio-acetamide in white prisms, melting point 94–95° C.

100 g. of tetrahydro-pyranyloxy-thio-acetamide, 284 g. of 5-acetoxy-3-bromo-2-pentanone, and 134 g. of pyridine in 1300 ml. of absolute benzene are heated with stirring for 4 hours in a three-liter four-necked flask. The reaction mixture, separating into two layers, is cooled in an ice bath, the supernatant benzene layer decanted off and the half solid mass remaining extracted in the warm with 150 ml. of benzene each time. The combined benzene solutions are evaporated in vacuum. The red oily residue is taken up in 1000 ml. of absolute ether and purified by addition of activated charcoal. The yellow clear ether solution is evaporated to a volume of about 300 ml. and treated dropwise with stirring and cooling with about 10 percent hydrogen chloride-containing ether, until the precipitation ceases. The reaction mixture is left to stand overnight. The supernatant ether solution is subsequently decanted off. The remaining semi-solid mass is taken up in 100 ml. of water, filtered over active charcoal and made alkaline with solid sodium carbonate. The aqueous phase is extracted five times with 300 ml. of ether. The combined ether eluates are dried over sodium sulfate and evaporated. By distillation in high vacuum there is obtained 2-hydroxymethyl-4-methyl-5-($\beta$-acetoxyethyl)-thiazole of boiling point 90–95° C./0.1 torr as light-colored viscous oil; $n_D^{23}=1.5312$.

10 g. of 2-hydroxymethyl-4-methyl-5-($\beta$-acetoxy-ethyl) thiazole are dissolved in 100 ml. of glacial acetic and treated with stirring with 7.5 g. of potassium dichromate in 15 ml. of water within 10 to 15 minutes. The reaction mixture is heated on the steam bath for 30 minutes. The green solution is concentrated in vacuum, and the residue repeatedly extracted with ether. The ether extracts are combined, washed with sodium carbonate solution, dried, and concentrated. After distillation at bath temperature of 115° C. at $10^{-2}$ torr, there is obtained pure 2-formyl-4-methyl-5-($\beta$-acetoxy-ethyl)-thiazole; $n_D^{21}=1.5358$; melting point of the picrate: 131° C.

42.6 g. of 2-formyl-4-methyl-5-($\beta$-acetoxy-ethyl)-thiazole in 100 ml. of absolute ether are added dropwise with stirring to a Grignard solution (prepared from 100 g. of ethyl bromide and 20 g. of magnesium in 300 ml. of absolute ether). The reaction mixture is boiled under reflux conditions for two hours and subsequently treated with saturated ammonium chloride solution. The ether layer is dried over sodium sulfate and concentrated. The residue is boiled under reflux conditions for one hour with 200 ml. of 0.5 N methanolic caustic potash. The concentrated solution is extracted with ether and concentrated. The easily crystallizable 2-($\alpha$-hydroxy-propyl)-4-methyl-5-($\beta$-hydroxy-ethyl)-thiazole of melting point 88–89° C. is obtained from the residue.

5.6 g. of 2-methyl-4-amino-5-bromomethyl-pyrimidine hydrobromide are dissolved at 40–50° C. in a mixture of 40 ml. of absolute dimethyl-formamide and 20 ml. of nitromethane and heated at 55–60° C. for six hours, and after addition of 2.5 g. of 2-($\alpha$-hydroxypropyl)-4-methyl-5-($\beta$-hydroxy-ethyl)-thiazole, the solution is concentrated in high vacuum at 50° C. The residue is taken up with 20 ml. of isopropanol and 10 ml. of ethyl acetate. The hygroscopic crystals which precipitate out are filtered off by suction. The quaternary salt obtained in this way is purified by fractional crystallization from a mixture of methanol/ethyl acetate. The 2-($\alpha$-hydroxy-propyl)-thiamine bromide hydrobromide obtained melts at 245° C.

With the aid of the Grignard reaction the 2-formyl-4-methyl-5-($\beta$-acetoxy-ethyl)-thiazole obtained according to Example 1 can be reacted with the following halides:

Thus are obtained, under the reaction conditions described in Example 1, by employment of—

Methyl magnesium iodide: 2-($\alpha$-hydroxy-ethyl)-4-methyl-5-($\beta$-hydroxy-ethyl)-thiazole; melting point 83–84° C.
Isopropyl magnesium chloride: 2-($\alpha$-hydroxy-$\beta$-methyl)-propyl-4-methyl-5-($\beta$-hydroxy-ethyl)-thiazole; $n_D^{22}=1.5458$.
Propargyl magnesium bromide: 2-[$\alpha$-hydroxy-n-butyne-(3)]-4-methyl-5-($\beta$-hydroxy-ethyl)-thiazole.
Phenyl magnesium bromide: 2-($\alpha$-hydroxy-benzyl)-4-methyl-5-($\beta$-hydroxyethyl)thiazole; meling point 101–102° C.
Benzyl magnesium chloride: 2-($\alpha$-hydroxy-$\beta$-phenethyl)-4-methyl-5-($\beta$-hydroxy-ethyl)-thiazole; melting point 114–115° C.

*Example 2*

24 g. of the 2-formyl-4-methyl-5-($\beta$-acetoxy-ethyl)-thiazole (obtained according to Example 1) are introduced dropwise into a Grignard solution (prepared from 100 ml. of absolute ether, 32 g. of isopropyl chloride and 9 g. of magnesium). The reaction mixture is heated under reflux conditions for a half hour. Subsequently the Grignard complex formed is decomposed by addition of a saturated ammonium chloride solution. The ether layer is separated, dried over sodium sulfate and concentrated. The oily crude base remaining behind is taken up in absolute ether, converted into the ether-insoluble hydrochloride by addition of anhydrous hydrochloric acid and filtered off. The ethereal mother liquor with the non-basic side products remaining in solution is discarded. The hydrochloride is taken up in a little water. The base set free by addition of solid sodium carbonate is extracted with ether or methylene chloride. The eluate is dried over sodium sulfate and evaporated. The 2-($\alpha$-hydroxy-$\beta$-methyl) - propyl-4-methyl-5-($\beta$-acetoxy-ethyl)-thiazole precipitated as oil can be freed from small quantities of 2-($\alpha$-hydroxy-$\beta$-methyl)-propyl-4-methyl-5-($\beta$-hydroxy-ethyl)-thiazole by adsorption of the ethereal solution on 220 g. of Florisil. By elution with benzene pure 2 - ($\alpha$-hydroxy-$\beta$-methyl) - propyl-4-methyl-5-($\beta$-acetoxy-ethyl)-thiazole is obtained. Boiling point 148–150° C./0.01 torr; $n_D^{22}=1.5120$.

The 2 - formyl - 4 - methyl - (β - acetoxy - ethyl)-thiazole can be reacted with the following halides with the help of the Grignard reaction:

Thus are obtained, under the reaction conditions described in Example 2, by employment of—

Methyl magnesium iodide: 2-(α-hydroxy-ethyl)-4-methyl-5-(β-acetoxy-ethyl)-thiazole; boiling point 150° C./0.04 torr; $n_D = 1.5234$.

Ethyl magnesium bromide: 2-(β-hydroxy-propyl)-4-methyl-5-(β-acetoxy-ethyl)-thiazole; boiling point 155° C./0.04 torr.

Propargyl magnesium bromide: 2-[α-hydroxy-n-butyn-(3)]-methyl-5-(β-acetoxy-ethyl-)thiazole; boiling point 142–145° C./0.01 torr.

Phenyl magnesium bromide: 2-(α-hydroxy-benzyl)-4-methyl-5-(β-acetoxy-ethyl)-thiazole; boiling point 155–158° C./0.002 torr.

Benzyl magnesium chloride: 2-(α-hydroxy-β-phenethyl)-4-methyl-5-(β-acetoxy-ethyl)-thiazole; boiling point 162–164° C./0.002 torr.

*Example 3*

11.0 g. of 2 - hydroxymethyl - 4 - methyl - 5 - (β-acetoxy - ethyl) - thiazole are dissolved in 30 ml. of methanol and treated with 100 ml. of methanolic N caustic potash. The solution is left to stand for 24 hours at 20° C. and subsequently concentrated under reduced pressure at 40° C. The residue is taken up in benzene and absorbed on kieselgel. By elution with ether and benzene ether mixtures crystals of 2 - hydroxymethyl-4-methyl-5-(β-hydroxy-ethyl)-thiazole of melting point 81–82° C. are obtained.

By quarternization with 2 - methyl - 4 - amino - 5-bromo - methyl - pyrimidine hydrobromide there is obtained (according to the method described in Example 1) 2 - hydroxymethyl - thiamine bromide hydrobromide of melting point 228° C. (dec.).

*Example 4*

200 g. of lactic acid nitrile are poured with 1000 ml. of absolute benzene into a 2½ liter four-necked flask and treated with 2 g. of toluene sulfonic acid. Into the mixture (cooled to +5° C.) 260 ml. of absolute dihydro pyran are slowly added dropwise. The mixture is further stirred for an hour at the same temperature. Subsequently the reaction mixture is slowly brought to room temperature. As soon as the temperature has reached 15° C. a reflux condenser is affixed and the mixture heated for two hours on the steam bath. After cooling the mixture is poured on ice, the aqueous phase separated and the benzene phase made alkaline with saturated sodium bicarbonate solution. It is now washed neutral with water and the benzene evaporated. By distillation under reduced pressure pure lactic acid nitrile tetrahydro-pyranyl ether is obtained; boiling point 95–110° C./16 torrs.

100 g. of lactic acid nitrile tetrahydro-pyranyl ether are mixed with 500 ml. of a solution of 1 percent diethyl amine in ethanol. The mixture is cooled to −20° C. in a closeable vessel and fumigated for four hours with hydrogen sulfide. Then the reaction vessel is closed and left to stand for a week at room temperature. Subsequently, the reaction mixture is poured out into a one-liter flask and evaporated in vacuum. The residue is dissolved in acetic acid ethyl ester and treated with low-boiling petroleum ether up to incipient turbidity. By letting the mixture stand in the cold, crystalline lacetic acid tetrahydro-pyranyl ether thioamide is obtained; melting point 81°.

55 g. of lactic acid nitrile tetrahydro-pyranyl ether thioamide and 125 g. of 5 - acetoxy - 3 - bromo - 2-pentanone are mixed with 150 ml. of pyridine and 600 ml. of benzene. The mixture is boiled under reflux conditions for four hours. Subsequently the reaction mixture is cooled in an ice bath and the benzene-pyridine mixture precipitating from the oily phase formed is decanted. The residue is washed several times with hot benzene. The combined benzene-pyridine mixtures are evaporated. The residue is taken up in benzene a further two times, concentrated and digested with ether in order to completely remove the pyridine. The solid pyridine hydrochloride is filtered off by suction. The filtrate is treated with hydrochloric acid-ether up to Congo acid reaction. A syrupy mass precipitates out overnight. After pouring off the supernatant ether solution, the precipitated mass is washed twice with ether, taken up in a little water and, by treatment with sodium bicarbonate, converted into the free base which is extracted with methylene chloride. The methylene chloride solution is dried over sodium sulfate and evaporated. 2-α-hydroxy-ethyl - 4 - methyl - 5 - acetoxy -ethyl -thiazole is obtained; boiling point 148–152° C./0.004 torr; $n_D^{20} = 1.5234$.

This compound is oxidized in a manner analogous to that described in Example 1, whereby 2-acetyl-4-methyl-5-(β-acetoxy-ethyl)-thiazole is obtained in the form of a colorless oil of boiling point 123° C./0.001 torr; $n_D^{23} = 1.5233$. (Melting point of the p-nitro-phenyl-hydrazone: 173° C., after recrystallization from ethyl acetate/petroleum ether.)

By reaction of this compound with methyl iodide under the conditions of the Grignard reaction (according to the process of Example 1) there is obtained 2-(α-methyl - α - hydroxy - ethyl) - 4 - methyl - 5 - (β - hydroxy - ethyl) - thiazole; melting point 104–105° C.

By quarternization with 2 - methyl - 4 - amino - 5-bromo - methyl - pyrimidine hydrobromide there is obtained (according to the process of Example 1) 2-(α-methyl - α - hydroxy - ethyl) - thiamine bromide hydrobromide of melting point 255° C.

*Example 5*

14 g. of 2 - acetyl - 4 - methyl - 5 - (β - acetoxy-ethyl) - thiazole are treated with 11 g. of orthoformic acid ester, 10 ml. of dioxane and 50 ml. of absolute benzene with about 12 percent hydrochloric acid and left to stand for 48 hours at room temperature. Subsequently the reaction mixture is made neutral by addition of a solution of sodium ethylate in ethyl alcohol. Thereby the acyloxy group is simultaneously saponified. The solution is concentrated under reduced pressure after separation of the precipitating sodium chloride. The excess orthoformic acid ester is distilled off in high vacuum at about 80° C. (bath). The residue is extracted under reflux conditions with petroleum ether (boiling range 35–50° C.). The diethyl acetal of the 2-acetyl-4-methyl-5-(β-hydroxy-ethyl)-thiazole, which precipitates as crystals, melts at 77–78° C.

We claim:
1. A compound of the formula:

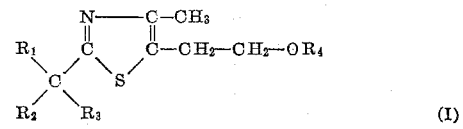

(I)

wherein
$R_1$ is selected from the group consisting of hydrogen and lower alkyl,
$R_2$ is selected from the group consisting of hydrogen, lower alkyl, lower alkoxy, lower alkenyl, lower alkynyl, phenyl, and phenyl-lower alkyl,
$R_3$ is selected from the group consisting of hydroxyl and lower alkoxy, except that when either of $R_2$ and $R_3$ is lower alkoxy, the other of $R_3$ and $R_2$ must be lower alkoxy, and
$R_4$ is selected from the group consisting of lower alkanoyl, benzoyl and the acid moieties of the mineral acids.

2. A quaternization product of a compound of claim 1 having the formula:

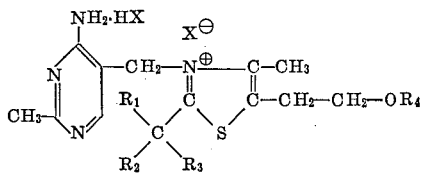

wherein
X is the anion of a strong acid, and
$R_1$ through $R_4$ have the same meaning as in claim 1.

3. 2 - hydroxymethyl - 4 - methyl-5-($\beta$-acetoxy-ethyl)-thiazole.

4. 2 - ($\alpha$-hydroxy-propyl) - 4 - methyl-5-($\beta$-acetoxy-ethyl)-thiazole.

5. 2 - ($\alpha$-hydroxy-propyl) - 4 - methyl-5-($\beta$-hydroxy-ethyl)-thiazole.

6. 2 - ($\alpha$-methyl-$\alpha$-hydroxy-ethyl) - 4 - methyl-5-($\beta$-acetoxy-ethyl)-thiazole.

7. 2 - ($\alpha$-methyl-$\alpha$-hydroxy-ethyl) - 4 - methyl-5-($\beta$-hydroxy-ethyl)-thiazole.

8. 2 - ($\alpha$-hydroxy-$\beta$-methyl)-propyl - 4 - methyl-5-($\beta$-acetoxy-ethyl)-thiazole.

9. 2 - ($\alpha$-hydroxy-$\beta$-methyl)-propyl - 4 - methyl-5-($\beta$-hydroxy-ethyl)-thiazole.

10. 2 - ($\alpha$-hydroxy-ethyl) - 4 - methyl-5-($\beta$-acetoxy-ethyl)-thiazole.

11. 2 - [$\alpha$-hydroxy-n-butyne-(3)] - 4 - methyl-5-($\beta$-acetoxy-ethyl)-thiazole.

12. 2 - [$\alpha$-hydroxy-n-butyne-(3)] - 4 - methyl-5-($\beta$-hydroxy-ethyl)-thiazole.

13. 2 - ($\alpha$-hydroxy-benzyl) - 4 - methyl-5-($\beta$-acetoxy-ethyl)-thiazole.

14. 2 - ($\alpha$-hydroxy-benzyl) - 4 - methyl-5-($\beta$-hydroxy-ethyl)-thiazole.

15. 2 - ($\alpha$-hydroxy-$\beta$-phenethyl) - 4 - methyl-5-($\beta$-acetoxy-ethyl)-thiazole.

16. 2 - ($\alpha$-hydroxy-$\beta$-phenethyl) - 4 - methyl-5-($\beta$-hydroxy-ethyl)-thiazole.

17. 2-hydroxymethyl-thiamine bromide hydrobromide.

18. 2-($\alpha$-hydroxy-propyl)-thiamine bromide hydrobromide.

19. 2-($\alpha$-hydroxy-$\beta$-methyl)-propyl-thiamine bromide hydrobromide.

20. A process for the preparation of a compound of the formula:

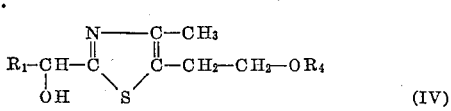

wherein
$R_1$ is selected from the group consisting of hydrogen and lower alkyl, and
$R_4$ is selected from the group consisting of hydrogen, lower alkanoyl, benzoyl or the acid moieties of the mineral acids, comprising the steps of reacting a compound of the formula:

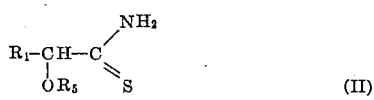

wherein
$R_1$ has the above meaning, and
$R_5$ is selected from the group consisting of tetrahydropyranyl, tetrahydro-furanyl, vinyl, allyl, and benzyl, with a compound of the formula:

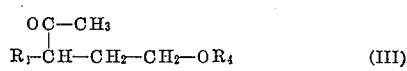

wherein
$R_4$ has the above meaning, and
$R_6$ is halogen, and subjecting the reaction product to hydrolysis or to hydrogenolysis thereby replacing the $R_5$ group with hydrogen.

21. A process for preparing a compound of the formula:

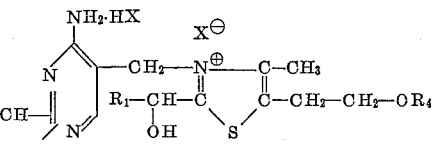

wherein
$R_1$ is selected from the group consisting of hydrogen and lower alkyl, and
$R_4$ is selected from the group consisting of hydrogen, lower alkanoyl, benzoyl or the acid moieties of the mineral acids, comprising the steps of preparing a compound of Formula IV in claim 20 according to the process of claim 20, and reacting said compound of Formula IV with a compound of the formula:

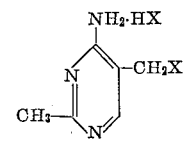

wherein X is the anion of a strong acid.

22. A process for the preparation of a compound of the formula:

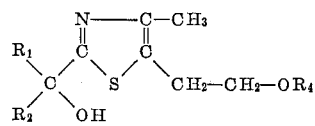

wherein
$R_1$ is selected from the group consisting of hydrogen and lower alkyl,
$R_2'$ is selected from the group consisting of lower alkyl, lower alkenyl, lower alkynyl, phenyl, and phenyl-lower alkyl, and
$R_4$ is selected from the group consisting of hydrogen, lower alkanoyl, benzoyl and the acid moieties of the mineral acids, comprising the steps of (a) preparing a compound of Formula IV in claim 20 according to the process of claim 20, (b) treating said compound of Formula IV with a chemical oxidant or catalytically oxidizing said compound of Formula IV to give a ketone of the formula:

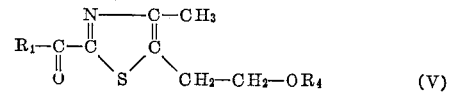

wherein $R_1$ and $R_4$ have the meanings given above (c) and reacting the compound of Formula V with a compound of the formula:

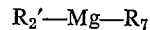

wherein $R_2'$ has the meaning given above, and $R_7$ is halogen, and (d) decomposing the resulting Grignard addition product to give a compound of Formula VI.

23. A process for the preparation of a compound of the formula:

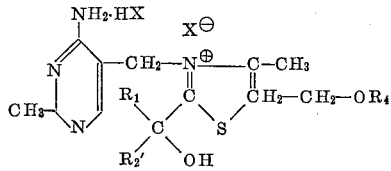

wherein
$R_1$, $R_2'$ and $R_4$ have the same meanings as in claim 22, and
X is the anion of a strong acid, comprising (a) preparing a compound of Formula VI in claim 22 according to the process of claim 22, and (b) reacting said compound of Formula VI with a compound of the formula:

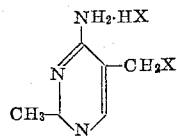

wherein X has the above meaning.

24. A process for the preparation of a compound of the formula:

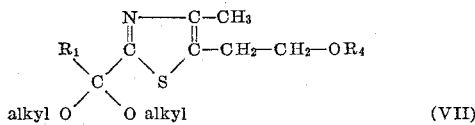

wherein
  $R_1$ is selected from the group consisting of hydrogen and lower alkyl, and
  $R_4$ is selected from the group consisting of hydrogen, lower alkanoyl, benzoyl and the acid moieties of the mineral acids,
comprising the steps of (a) preparing a compound of Formula V in claim 22 according to the process of claim 22, and (b) treating said compound of Formula V with a dialkoxylating acetalizing agent.

25. A process for the preparation of a compound of the formula:

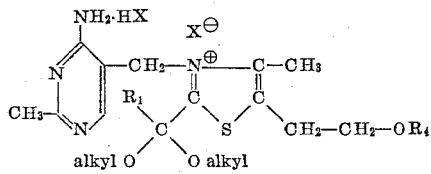

wherein
  $R_1$ and $R_4$ have the same meanings as in claim 24, and
  X is the anion of a strong acid,
comprising the steps of (a) preparing a compound of Formula VII in claim 24 according to the process of claim 24, and (b) reacting said compound of Formula VII with a compound of the formula:

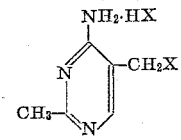

wherein X has the meaning given above.

26. A compound of the formula

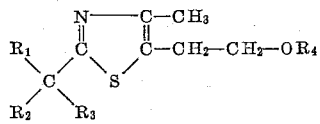

wherein
  $R_1$ is selected from the group consisting of hydrogen and lower alkyl,
  $R_2$ is selected from the group consisting of hydrogen, lower alkyl, lower alkoxy, lower alkenyl, lower alkynyl, phenyl and phenyl-lower alkyl,
  $R_3$ is selected from the group consisting of hydroxyl and lower alkoxy except that $R_1$ and $R_2$ together must contain at least two carbon atoms and when either of $R_2$ and $R_3$ is alkoxy, the other of $R_2$ and $R_3$ must be alkoxy, and $R_4$ is selected from the group consisting of hydrogen, lower alkanoyl, benzoyl and the acid moieties of the mineral acids.

27. A compound of the formula

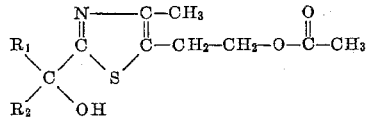

wherein
  $R_1$ is hydrogen or lower alkyl, and
  $R_2$ is selected from the group consisting of hydrogen, lower alkyl, lower alkenyl and lower alkynyl.

28. A compound of the formula

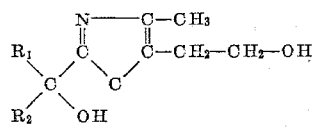

wherein
  $R_1$ is hydrogen or lower alkyl, and
  $R_2$ is hydrogen, lower alkyl, lower alkenyl, or lower alkynyl such that $R_1$ and $R_2$ together contain at least two carbon atoms.

29. A compound of the formula

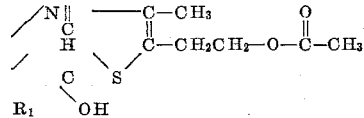

wherein $R_1$ is phenyl or phenyl-lower alkyl.

30. A compound of the formula

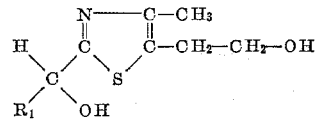

wherein $R_1$ is phenyl or phenyl-lower alkyl.

31. A compound of the formula

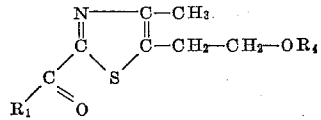

wherein
  $R_1$ is hydrogen or lower alkyl, and
  $R_4$ is hydrogen, lower alkanoyl, benzoyl or the acid moieties of the mineral acids.

32. 2-formyl-4-methyl-5-β-acetoxyethyl-thiazole.

References Cited by the Examiner

UNITED STATES PATENTS

| | | | |
|---|---|---|---|
| 2,133,969 | 10/1938 | Buchman | 260—302 |
| 2,235,862 | 3/1941 | Zima | 260—256.6 |
| 3,042,684 | 7/1962 | Young | 260—319 |

FOREIGN PATENTS 664,789  9/1938  Germany.

OTHER REFERENCES

Beraud et al.: Bull. Chim. Soc., France, 1962, pp. 2072–2074.

Cram et al.: Organic Chemistry, McGraw-Hill Book Co., Inc., New York, 1959, pp. 272–273 and 294.

ALEX MAZEL, *Primary Examiner.*

MARY O'BRIEN, *Assistant Examiner.*

UNITED STATES PATENT OFFICE
CERTIFICATE OF CORRECTION

Patent No. 3,304,305                            February 14, 1967

Joseph Kiss et al.

It is hereby certified that error appears in the above numbered patent requiring correction and that the said Letters Patent should read as corrected below.

Column 10, lines 5 to 10, the left-hand portion of the formula should appear as shown below instead of as in the patent

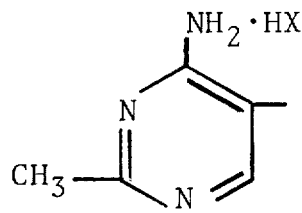

same column 10, lines 30 to 35, the left-hand portion of the formula should appear as shown below instead of as in the patent

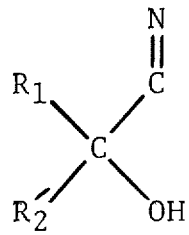

same column 10, lines 65 to 70, for that portion of the formula reading

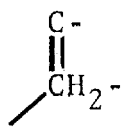          read          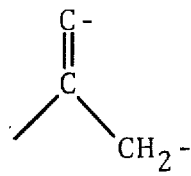

column 11, lines 5 to 10, the formula should appear as shown below instead of as in the patent:

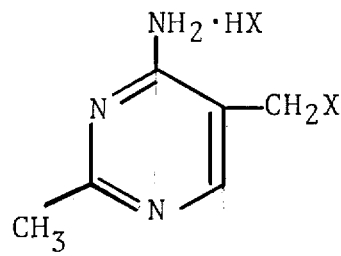

column 12, lines 27 to 31, the formula should appear as shown below instead of as in the patent:

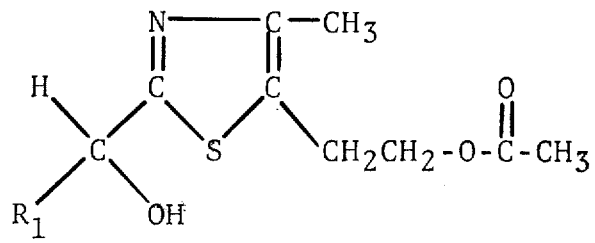

Signed and sealed this 11th day of February 1969.

(SEAL)
Attest:

EDWARD M. FLETCHER, JR.
Attesting Officer

EDWARD J. BRENNER
Commissioner of Patents